Figure 1:
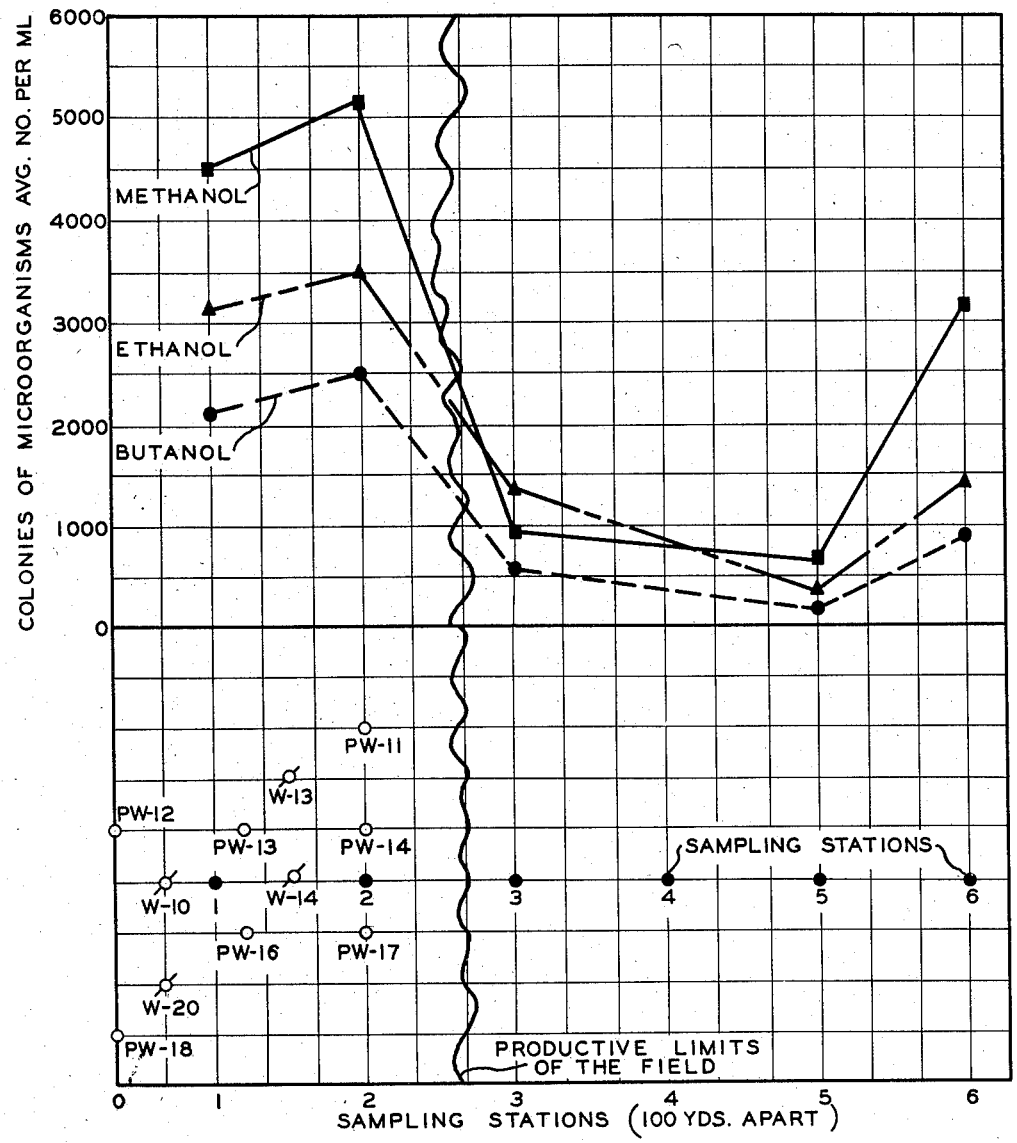

March 31, 1959 D. O. HITZMAN 2,880,142
PROSPECTING FOR PETROLEUM DEPOSITS
Filed Dec. 10, 1956 2 Sheets-Sheet 1

INVENTOR.
D.O. HITZMAN
BY *Hudson and Young*
ATTORNEYS

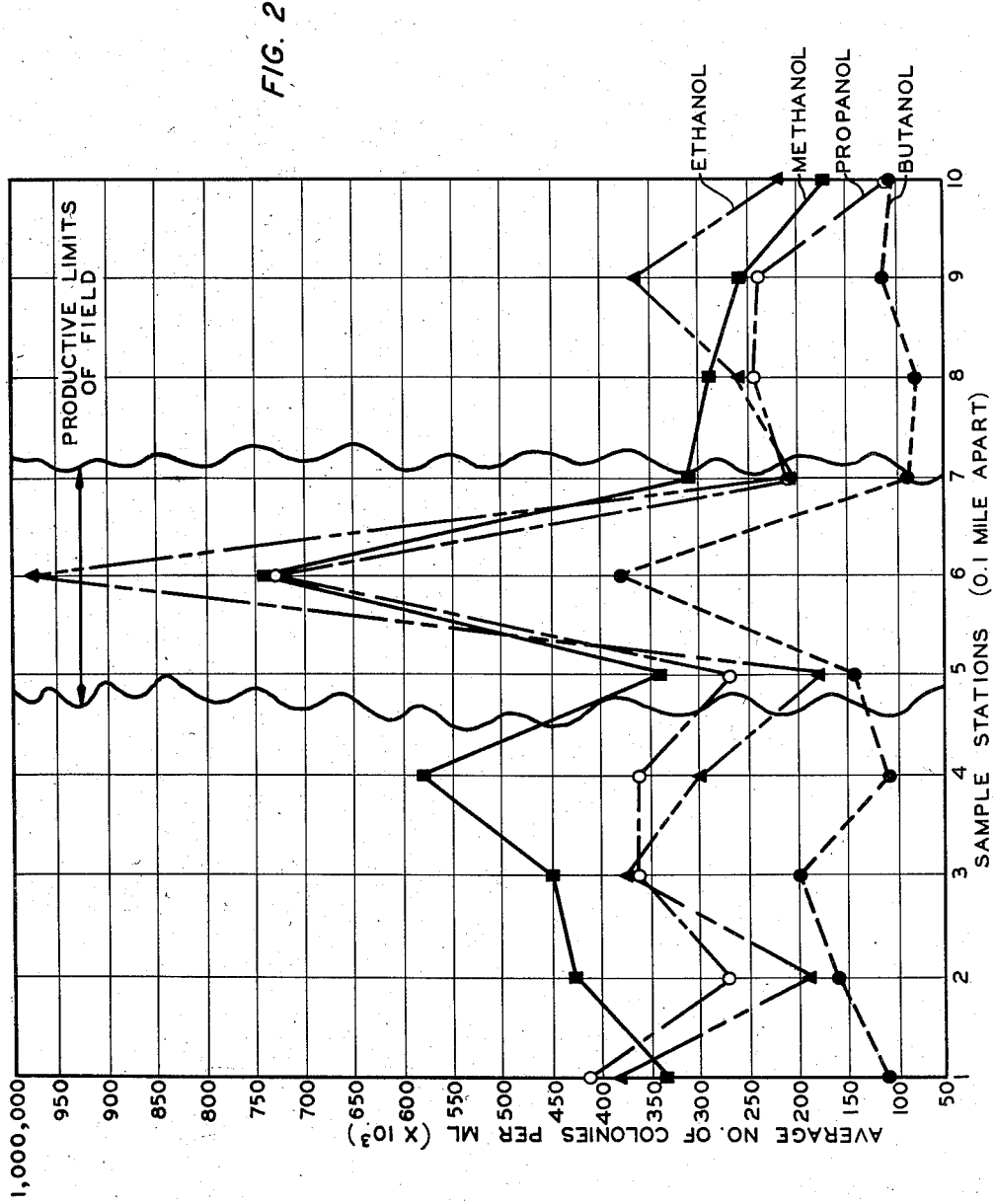

United States Patent Office 2,880,142
Patented Mar. 31, 1959

2,880,142

PROSPECTING FOR PETROLEUM DEPOSITS

Donald O. Hitzman, Bartlesville, Okla., assignor to Phillips Petroleum Company, a corporation of Delaware Application December 10, 1956, Serial No. 627,233

7 Claims. (Cl. 195—103.5)

This invention relates to a method of prospecting for petroleum deposits. In one aspect, this invention relates to microbiological prospecting for subterranean oil and gas deposits.

It is an established bacteriological fact that bacteria are adaptive organisms and can serve as indicators for specific environmental conditions. Microbiological prospecting is based on the theory that hydrocarbon gases have been continually escaping from oil and gas deposits and pervade the surface soils. Said gases permeate and provide an atmosphere in the soil below surface contamination which atmosphere, in the past, has been selective in determining the microbiological growth which can exist in said atmosphere or environment. This selectivity results in a biological population in the soil which utilizes these hydrocarbon gases and which can grow only in their presence. The presence of these environmental selective microorganisms is indicative of the presence of the hydrocarbon gases in the soil and thus indicates the presence of subterranean oil and gas deposits. Samples of soil taken over a hydrocarbon bearing formation will contain more hydrocarbon consuming microorganisms than samples of soil taken from a "dry" area. Microbiological prospecting can thus function as an aid to conventional methods of prospecting (geological, geophysical, etc.) by indicating the presence or absence of hydrocarbon deposits in a favorable formation located by one of the conventional methods of prospecting or by delineating the boundaries of a known hydrocarbon deposit. For example, microbiological prospecting can be employed to delineate the boundaries of a newly discovered oil pool.

Many methods of microbiological prospecting have been proposed. In practically all of said methods, soil samples are gathered from the area under investigation and processed in one way or another to produce a qualitative indication of the presence or absence of hydrocarbon gases in the soil. So far as is presently known, none of the proposed methods have been successful to the degree that it has been adopted to any great extent on a commercial basis. This is believed to be due primarily to the methods of analysis having inherent limitations as to accuracy and also to requirements for specific apparatus and techniques not readily adapted for use in field laboratories.

I have discovered that hydrocarbon consuming bacteria can readily adapt to the presence of certain organic liquids normally toxic to most microorganisms. I have also discovered that an accumulation of hydrocarbon consuming microorganisms in the soil can be revealed by exposing and growing said microorganisms in the presence of certain organic liquids normally toxic to most microorganisms. Based on these discoveries, I have invented a method of prospecting for subterranean oil and gas deposits utilizing ordinary laboratory equipment and a technique which is readily adapted for use in small portable field laboratories. Furthermore, my method of prospecting gives more accurate and reproducible results than have been possible by the methods of the prior art.

Broadly speaking, the invention comprises exposing the hydrocarbon consuming microorganisms in soil samples from the area under investigation to an organic liquid, normally toxic to microorganisms, under incubating conditions for a period of time sufficient to permit the propagation and growth of the microorganisms, and then counting the number of colonies of said microorganisms which develop.

Figures 1 and 2 are graphs illustrating results obtained in the practice of the invention.

An object of this invention is to provide a method of microbiological prospecting for subterranean oil and gas deposits. Another object of this invention is to provide a method of prospecting for subterranean oil and gas deposits by means of which it is possible to locate said deposits without regard to the geological structure in which said deposits occur. Another object of this invention is to provide a method of prospecting for subterranean oil and gas deposits by means of which the boundaries of a known deposit of oil and/or gas can be delineated. Still another object of this invention is to provide a method of microbiological prospecting for subterranean oil and gas deposits wherein samples of soil from the area under investigation are analyzed for a direct measurement of the hydrocarbon consuming microorganisms present at the time of sampling. Still another object of this invention is to provide a method of microbiological prospecting for subterranean oil and gas deposits wherein the sources of error common to the methods of the prior art are eliminated. Another object of this invention is to provide a method of microbiological prospecting for subterranean oil and gas deposits which is readily adapted for use in small portable field laboratories. Other aspects, objects and advantages of the invention will be apparent to those skilled in the art in view of this disclosure.

Thus according to this invention, there is provided a method of prospecting for subterranean petroleum hydrocarbon deposits, which comprises: subjecting samples of soil from spaced points in the area under investigation to the action of an organic liquid, normally toxic to microorganisms, as a substrate in a culture medium for a period of time sufficient to permit propagation and growth of hydrocarbon-consuming microorganisms, whose presence is indicative of sub-surface petroleum hydrocarbon deposits; and examining said culture medium for evidence of said propagation and growth.

It is to be noted that the organic liquid to which the microorganisms are subjected is one which is normally toxic to microorganisms and which kills most bacteria. However, as mentioned above, some microorganisms can readily adapt themselves to utilize the released hydrocarbon gases as their primary source of nutrient. These same microorganisms can readily adapt to utilize said organic liquid. In the practice of the invention, said organic liquid is included as the sole substrate in a culture medium devoid of other sources of carbon. Thus, in order for propagation and growth to occur, the microorganisms must utilize the organic liquid as a nutrient. Aliquots of the soil sample are added to the culture medium in a culture dish, incubated, and the number of colonies of microorganisms which develop are counted. Since the hydrocarbon consuming microorganisms are the only ones which can readily adapt to the organic liquid, the higher the number of colonies, the more indication of the presence of an oil and/or gas deposit.

The organic liquid is preferably one having the same carbon chain length as the released gases most commonly found in the soil. Since these gases usually contain from one to four carbon atoms, an organic liquid containing from one to four carbon atoms is usually preferred. Suitable organic liquids for use in the practice of the invention include, among others, the aliphatic alcohols, such as methanol, ethanol, 1-propanol, 2-propen-1-ol, 1-butanol, 2-butanol, 2-methyl-2-propanol, 2-buten-1-ol, 3-buten-1-ol, and 3-buten-2-ol. A presently preferred group of organic liquids are the normal aliphatic alcohols, such as methanol, ethanol, 1-propanol, and 1-butanol.

Soil samples are secured from the area under investigation from different depths below the surface, depending to some extent upon the moisture content of the soil and the season of the year. In any event, it is preferred that the soil sample be taken at a sufficient depth below the surface to avoid surface contamination. Depths from six inches to three feet are usually preferred, with depths from two to three feet being more preferred. In taking the samples, it is important that the soil sample be a sample of undisturbed soil at the desired depth. One convenient method of sampling is to dig a hole with the aid of an ordinary posthole digger to approximately the desired depth and then by the use of a hand auger, take a sample of undisturbed soil from the side of the hole at the desired depth. The area under investigation is usually sampled according to a prearranged plot of said area. Obviously any desired plot can be employed. At each sampling station, two holes ten feet apart are dug and the samples collected. The samples are preferably placed in suitable sterile glass containers.

One hundred grams of soil from each hole are blended to give a two hundred gram sample for each sampling station. The two hundred gram sample of soil is then blended in a Waring blendor or other suitable mixing device for approximately one minute with 1,000 milliliters of a sterile mineral medium having the following composition:

MINERAL MEDIUM NO. 1

| | |
|---|---|
| $NH_4NO_3$ grams | 1000 |
| $MgSO_4$ do | 0.1 |
| $K_2HPO_4$ do | 0.5 |
| $CaSO_4$ do | 0.1 |
| $NH_4NO_3$ grams | 1 |

The pH of the soil suspension is then adjusted to 7 while the suspension is being agitated. One milliliter of the soil suspension is then added to 100 milliliters of said sterile mineral medium to give a 1 to 100 dilution soil suspension. One milliliter of the 1 to 100 dilution is then added to 100 milliliters of the mineral medium to give a 1 to 10,000 dilution soil suspension.

The mineral medium which is used in preparing the above described soil suspensions and dilutions can be varied widely as is well known to bacteriologists. One other such mineral medium which can be used consists of:

MINERAL MEDIUM NO. 2

| | |
|---|---|
| $NH_4Cl$ grams | 1.0 |
| $K_2HPO_4$ do | 0.5 |
| $MgNH_4PO_4$ do | 0.5 |
| $CaSO_4$ do | 0.1 |
| Distilled water ml | 1000 |

Duplicate cultures at the desired dilutions are prepared from each of the 1 to 100 dilution soil suspension and the 1 to 10,000 dilution soil suspension by incorporating aliquot portions of each suspension into a culture medium, such as an agar medium, in a Petri dish. A suitable agar medium consists of:

| | |
|---|---|
| $NH_4NO_3$ grams | 1.0 |
| $MgSO_4$ do | 0.1 |
| $K_2HPO_4$ do | 0.5 |
| $CaSO_4$ do | 0.1 |
| Agar do | 15.0 |
| Distilled water ml | 1000 |

The normally toxic organic liquid of the invention, such as an alcohol, is incorporated into the agar medium in varying amounts as discussed hereafter and serves as the sole substrate or nutrient in the culture medium.

The prepared plates are allowed to solidify and are then incubated in an inverted position at about 37° C. for six days after which time they are removed from the incubator and the colonies which have developed are counted.

The amount of alcohol used in the agar medium varies with the kind of alcohol which is to be used. For example, when the alcohol is methanol or ethanol, sufficient alcohol is added to the aqueous agar medium so as to give a finished medium which is 2.5 percent by volume alcohol. When the alcohol is 1-propanol, sufficient alcohol is added to the aqueous agar medium to give a finished medium which contains 1.5 percent by volume of alcohol. When the alcohol is 1-butanol, sufficient alcohol is incorporated in the agar medium to give a finished medium which contains 0.5 percent by volume of alcohol.

Any number of cultures can be prepared. However, as a general rule, I have found it convenient to prepare at least two cultures at two different dilutions. For example, two dishes are prepared at a 1 to 1000 dilution and two dishes are prepared at the 1 to 10,000 dilution. Usually, when hydrocarbon consuming microorganisms are present, at least one of the dishes will develop a number of colonies which is within the counting range. The colonies in the culture dishes which develop colonies within the counting range are then counted and averaged to give the number of colonies for the sample being tested.

*Example I*

A series of samples from six sampling stations located 100 yards apart in a straight line and extending from within the limits of a producing oil field to without said oil field, i.e., across the boundary of said field, were collected as described above. Soil suspensions at 1 to 100 dilution and also at 1 to 10,000 were prepared as described above from the two samples taken at each sampling station. Duplicate cultures at a 1 to 1000 dilution and at a 1 to 10,000 dilution were prepared by incorporating aliquots of the 1 to 100 dilution soil suspension and to 1 to 10,000 soil suspension into approximately 12 milliliters of the above described agar medium using methanol, ethanol, and 1-butanol as substrate. Thus twelve dishes were prepared for each sample. The prepared dishes were allowed to solidify and were then incubated for six days at 37° C. after which time they were removed and the colonies which developed were counted. The percentage of alcohol used in each instance and the results of the colony counts for these tests are given in Table I below.

TABLE I

| Sample Station | Colony Count—Average No. per Milliliter | | | | |
|---|---|---|---|---|---|
| | 1 | 2 | 3 | 5 | 6 |
| Methanol (2.5%) | 4,500 | 5,160 | 916 | 666 | 3,160 |
| Ethanol (2.5%) | 3,160 | 3,500 | 1,320 | 360 | 1,400 |
| 1-Butanol (0.5%) | 2,160 | 2,500 | 560 | 216 | 930 |

The data given in Table I are presented as a graph in Figure 1. Said Figure 1 also shows the location of producing oil wells in the field relative to the location of the sampling stations. The productive limits of this field, indicated by the wavy line, have been well established by drilling. These data show the value of the invention in delineating the boundaries of a producing oil field. (Data from sampling station number 4 are not included in Table I or Figure 1 because the cultures from this sample were inadvertently destroyed.)

*Example II*

A series of samples from 10 sampling stations located 0.1 mile apart in a straight line extending completely across a producing oil field (different from Example I) were collected and cultures dishes were prepared and incubated as described above in Example I using methanol, ethanol, 1-propanol and 1-butanol as substrate. Thus sixteen dishes were prepared for each sample. The amount of alcohol used in each instance and the results of the colony counts for these tests are given below in Table II.

TABLE II

[Colony Count—Average No. per ml.]

| Sample Station | 2.5% Methanol | 2.5% Ethanol | 1.5% 1-Propanol | 0.5% 1-Butanol |
|---|---|---|---|---|
| 1 | 340,000 | 380,000 | 410,000 | 110,000 |
| 2 | 430,000 | 180,000 | 270,000 | 160,000 |
| 3 | 450,000 | 370,000 | 360,000 | 200,000 |
| 4 | 580,000 | 300,000 | 360,000 | 110,000 |
| 5 | 340,000 | 190,000 | 270,000 | 145,000 |
| 6 | 740,000 | 990,000 | 730,000 | 390,000 |
| 7 | 310,000 | 210,000 | 215,000 | 80,000 |
| 8 | 290,000 | 260,000 | 245,000 | 65,000 |
| 9 | 260,000 | 365,000 | 240,000 | 115,000 |
| 10 | 170,000 | 220,000 | 110,000 | 110,000 |

Figure 2 is a graph, similar to Figure 1, illustrating the data given in Table II.

It is to be understood that the invention is not to be limited by the above described sampling procedure. Obviously any suitable sampling procedure can be employed and the above suggested procedure is given for illustrative purposes only. However, it is to be noted that if the sampling procedure is to be varied, the precautions pointed out above should be observed.

It is a feature of my invention that it is readily adapted for use in the field. Thus, the preferred procedure is that a truck or trailer be equipped as a portable field laboratory and the collected samples taken directly to said laboratory and tested without delay after collecting. This, of course, gives the most reproducible results. However, as a practical matter, I have found that if the samples are tested within twenty-four hours after collection, results are obtained which can be reproduced with a high degree of accuracy. If for some reason the samples cannot be tested within twenty-four hours after collection, it is desirable that the samples be stored under refrigeration, for example, at a temperature of about 40 to 46° F. until tested.

The above described procedures for the preparation of the dilute soil suspensions are given for illustrative purposes only. As will be understood by bacteriologists, such procedures can be widely varied. The same is true for the procedure described in preparing the culture dishes.

As mentioned, the method of my invention gives results which are more accurate and reproducible than the methods of the prior art. When employing my method using soil suspensions of high dilution, the microorganisms are effectively isolated from all sources of carbon, such as in the soil sample itself, except the carbon which is present in the alcohol substrate (the dishes are incubated in air which contains carbon dioxide). Another advantage of employing the highly diluted soil suspensions and the plate method of culture is that the actual number of organisms present in an aliquot portion of the soil sample at the time of sampling is measured, i.e., each microorganism in the aliquot of the sample grows into a colony of microorganisms and a count of the colonies which develop gives a direct account of the microorganisms present in the soil at the time of sampling. In the methods of the prior art, when using the hydrocarbon utilization technique, the microorganisms in the sample are cultured in an atmosphere of the hydrocarbons plus oxygen and great numbers of microorganisms must be developed. Sufficient time must be allowed for enough microorganisms to develop so that the amount of hydrocarbon gas utilized can be measured with some degree of accuracy. If leaks occur in the system erroneous results will be obtained. Another source of error is consumption of oxygen from the hydrocarbon gas mixtures by microorganisms other than hydrocarbon consuming microorganisms which may be present in the soil sample. Thus it is seen that such methods create an artificial condition which introduces variable factors which can lead to unreliable results.

As will be understood by those skilled in the art, various modifications of the invention can be made or practiced in view of the above disclosure without departing from the spirit or scope of the invention.

I claim:

1. In a method of prospecting for subterranean petroleum deposits wherein samples of soil from spaced points in the area under investigation are analyzed for the presence of hydrocarbon-consuming microorganisms, whose presence is indicative of subsurface petroleum deposits, the improvement which comprises, subjecting an aliquot portion of each of said samples to the action of an aliphatic alcohol containing not more than 4 carbon atoms as a substrate in a culture medium under incubating conditions for a period of time sufficient to permit growth of said microorganisms, and examining said culture medium for evidence of said growth.

2. In a method of prospecting for subterranean petroleum deposits wherein samples of soil from spaced points in the area under investigation are analyzed for the presence of hydrocarbon-consuming microorganisms, whose presence is indicative of subsurface petroleum deposits, the improvement which comprises, subjecting an aliquot portion of each of said samples to the action of a normal aliphatic alcohol containing not more than 4 carbon atoms as a substrate in a culture medium under incubating conditions for a period of time sufficient to permit growth of said microorganisms, and examining said culture medium for evidence of said growth.

3. A method according to claim 2 wherein said alcohol is methanol.

4. A method according to claim 2 wherein said alcohol is ethanol.

5. A method according to claim 2 wherein said alcohol is 1-propanol.

6. A method according to claim 2 wherein said alcohol is 1-butanol.

7. A method of prospecting for subterranean petroleum hydrocarbon deposits, which comprises: collecting samples of soil from spaced points in the area under investigation; forming a suspension of each of said samples in an aqueous sterile inorganic salt medium; incorporating an aliquot of each of said suspensions in individual portions of a culture medium containing a normal aliphatic alcohol having from 1 to 4 carbon atoms as the sole substrate; maintaining said portions of culture medium thus inoculated under incubating conditions for a period of time sufficient to permit growth of hydrocarbon-consuming microorganisms whose presence is indicative of subsurface petroleum hydrocarbon deposits; examining said incubated cultures for evidence of said growth; and correlating said evidence of growth with the area under investigation.

References Cited in the file of this patent

UNITED STATES PATENTS

| 2,234,637 | Taggart | Mar. 11, 1941 |
| 2,269,889 | Blau | Jan. 13, 1942 |
| 2,294,425 | Sanderson | Sept. 1, 1942 |
| 2,349,472 | Taggart | May 23, 1944 |
| 2,574,070 | Stravinski | Nov. 6, 1951 |

OTHER REFERENCES

Porter: "Bacterial Chemistry and Physiology," 1946, publ. by John Wiley & Sons, Inc. (N.Y.), pp. 298 to 300.

Beerstecher: "Petroleum Microbiology," 1954, publ. by Elsevia Press Inc. (Houston), pp. 135, 136, 226 and 227.

UNITED STATES PATENT OFFICE

CERTIFICATE OF CORRECTION

Patent No. 2,880,142                                     March 31, 1959

Donald O. Hitzman

It is hereby certified that error appears in the printed specification of the above numbered patent requiring correction and that the said Letters Patent should read as corrected below.

Column 3, line 36, for "1000" read -- 1 --; line 40, for $$NH_4NO_3 \text{-------- grams ------ 1}$$

read $$\text{Distilled water ----- ml ----- 1000}$$

Signed and sealed this 22nd day of September 1959.

(SEAL)
Attest:

KARL H. AXLINE
Attesting Officer

ROBERT C. WATSON
Commissioner of Patents